(12) United States Patent
Minarik et al.

(10) Patent No.: US 11,748,210 B2
(45) Date of Patent: Sep. 5, 2023

(54) INTELLIGENT MONITORING OF BACKUP, RECOVERY AND ANOMALOUS USER ACTIVITY IN DATA STORAGE SYSTEMS

(71) Applicant: EMC IP Holding Company LLC, Hopkinton, MA (US)

(72) Inventors: Jennifer M. Minarik, Zionsville, IN (US); Brian E. Freeman, Golden, CO (US); Mark Malamut, Aliso Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/724,770

(22) Filed: Apr. 20, 2022

(65) Prior Publication Data

US 2022/0245035 A1 Aug. 4, 2022

Related U.S. Application Data

(63) Continuation-in-part of application No. 17/156,035, filed on Jan. 22, 2021, now Pat. No. 11,372,705.

(51) Int. Cl.
*G06F 11/14* (2006.01)
*G06F 11/07* (2006.01)

(52) U.S. Cl.
CPC ........ *G06F 11/1464* (2013.01); *G06F 11/076* (2013.01); *G06F 11/0772* (2013.01); *G06F 11/1451* (2013.01); *G06F 11/1461* (2013.01); *G06F 11/1469* (2013.01)

(58) Field of Classification Search
CPC ............. G06F 11/1464; G06F 11/1451; G06F 11/1461; G06F 11/1469; G06F 11/076; G06F 11/0772
See application file for complete search history.

(56) References Cited

U.S. PATENT DOCUMENTS 10,853,161 B2 * 12/2020 Ahad ................ G06F 16/90335
2020/0394802 A1 * 12/2020 Lee ......................... G06T 7/194

* cited by examiner

*Primary Examiner* — Nadeem Iqbal
(74) *Attorney, Agent, or Firm* — Staniford Tomita LLP

(57) ABSTRACT

Embodiments for a system and method of monitoring performance metrics of a computer network, by defining key performance indicators for the user behavior in the computer network, collecting behavior statistics for each user for each of the key performance indicators, and providing one or more anomaly detection policies to define anomalous behavior of the users with respect to data assets of the computer network. An anomaly detection policy is applied to the collected behavior statistics to detect anomalous user behavior and an alert notification is sent to administrative or security personnel upon each detected instance of abnormal user behavior.

20 Claims, 15 Drawing Sheets

| Metric 302 | Warning Threshold | Critical Threshold |
|---|---|---|
| | Asset Meta Data 304 | |
| CPU Utilization | 2 SD off from 30 day average | 3 SD off from 30 day average |
| Memory Usage | 2 SD off from 30 day average | 3 SD off from 30 day average |
| Number of Restores on an Asset | Exceeds 2 per 30 days | Exceeds 4 per 30 days |
| | Network Meta Data 306 | |
| KB per seconds | 2 SD off from 30 day average | 3 SD off from 30 day average |
| Backup Duration | 2 SD off from 30 day average | 3 SD off from 30 day average |
| | Backup Meta Data 308 | |
| Dedup ratio | Less than 30 | Less than 10 |
| Amount of Data backed up | 2 SD off from 30 day average | 3 SD off from 30 day average |
| Recovered to unique location | Any | Any |
| | User Customized Meta Data 310 | |
| User Entered | Customized by user | |

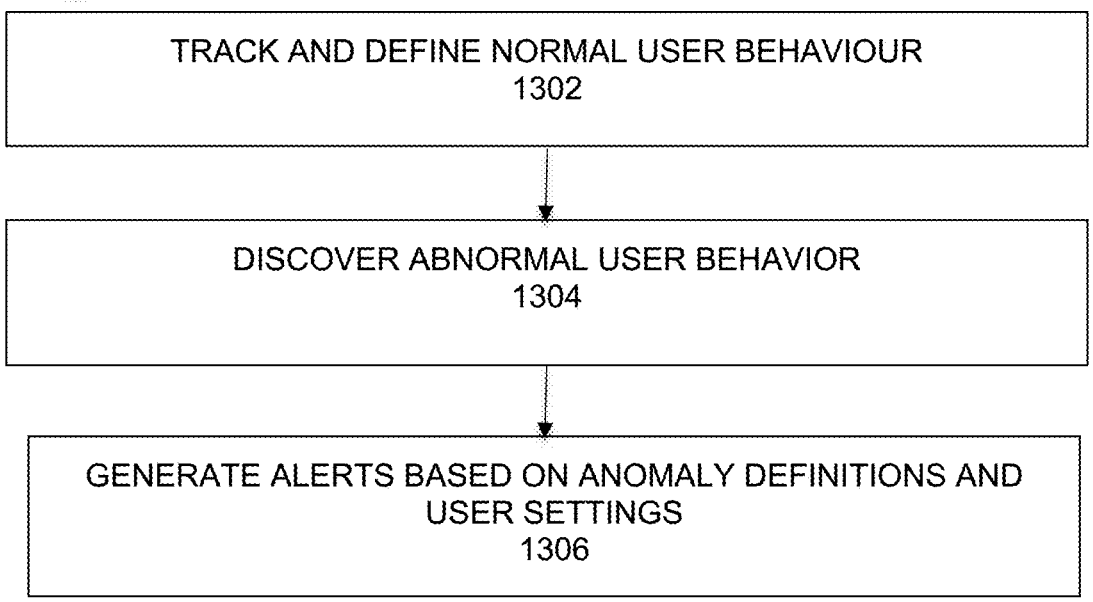

TRACK AND DEFINE NORMAL USER BEHAVIOUR
1302

DISCOVER ABNORMAL USER BEHAVIOR
1304

GENERATE ALERTS BASED ON ANOMALY DEFINITIONS AND USER SETTINGS
1306

| USER BEHAVIOR KPI | REASON TO TRACK |
|---|---|
| Frequency of Login | If previously unused login suddenly used to log in repeatedly |
| Length of Login | If user changes from minute length to hour length logins |
| Activities | User goes from none/minor activities to heavy deletions |
| Role Behaviors | User is significantly more active than other users in same role |
| Login Failures | Repeated Failures for Intrusion Detected |
| Login Location | Geographic Location of User Login |

FIG. 14

FIG. 16

INTELLIGENT MONITORING OF BACKUP, RECOVERY AND ANOMALOUS USER ACTIVITY IN DATA STORAGE SYSTEMS

CROSS-REFERENCE TO RELATED APPLICATIONS

This application is a Continuation-In-Part application and claims priority to U.S. patent application Ser. No. 17/156,035, filed on Jan. 22, 2021 and entitled "Intelligent Monitoring of Backup and Recovery Activity in Data Storage Systems" and which is hereby incorporated by reference in its entirety.

TECHNICAL FIELD

This invention relates generally to computer backup systems, and more specifically to monitoring backup and recovery activity using intelligent analysis tools.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. Backup programs are often provided by vendors that provide backup infrastructure (software and/or hardware) to customers under service level agreements (SLA) that set out certain service level objectives (SLO) that dictate minimum standards for important operational criteria such as uptime and response time, etc. Within a large organization, dedicated IT personnel or departments are typically used to administer the backup operations and work with vendors to resolve issues and keep their infrastructure current.

As enterprise systems grow and become more complex, it is important that backup administrators have the ability to quickly and easily see anomalies in their environments and determine if they are explainable by normal system behavior or need to be investigated. Many backup software products provide comprehensive alerts to notify and warn administrators about potential issues, such as storage capacity limits, out of service storage devices, corrupted data links, and so on. However, in large-scale networks, operators can easily become inundated with such notifications, and thus they often do not actually help operators because they fail to account for unique attributes of a user's environment. For example, a backup environment may have an average job size suddenly double in an unreasonably short period of time, or the network bandwidth usage could increase dramatically, or other some other unanticipated event could occur.

Such conditions may be caused by valid reasons, such as the deployment of new storage resources that need to be protected, or deployment of a new asset, and so on. Similarly, these conditions could indicate a problem, such as a system being compromised due to a ransomware or virus attack, software failure, and so on. Administrators need to be able to identify problems quickly so as to limit any damage due to bad actors or system failures that will affect the Service Level Objectives provided by the vendor. Likewise, while certain backup systems may provide usage metrics, such as deduplication rates, they do so only on a per asset basis with no comparison between different times or deployments or intelligent notification of potential issues to users. Any such analysis or identification of potential problem areas requires significant manual/mental work by the system administrator.

Another area of enterprise behavior that may create data vulnerability are the acts of employees, members, or users themselves. Certain patterns of user behavior may indicate an actual or potential threat to enterprise and system data. Present data protection systems typically do not monitor and analyze user behavior to detect possible threats to data from this angle.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 3 illustrates example key performance indicators for a deduplicated backup and recovery system in an example embodiment of the backup system of FIG. 1.

FIG. 13 is a flowchart that illustrates a method of monitoring user behavior to detect possible data threats, under some embodiments.

FIG. 14 is a table illustrating example user behavior KPIs for detecting abnormal user behavior, under some embodiments.

FIG. 16 is an example user interface display for reporting detailed information of detected user behavior anomalies under an embodiment.

DETAILED DESCRIPTION

Figure 1:
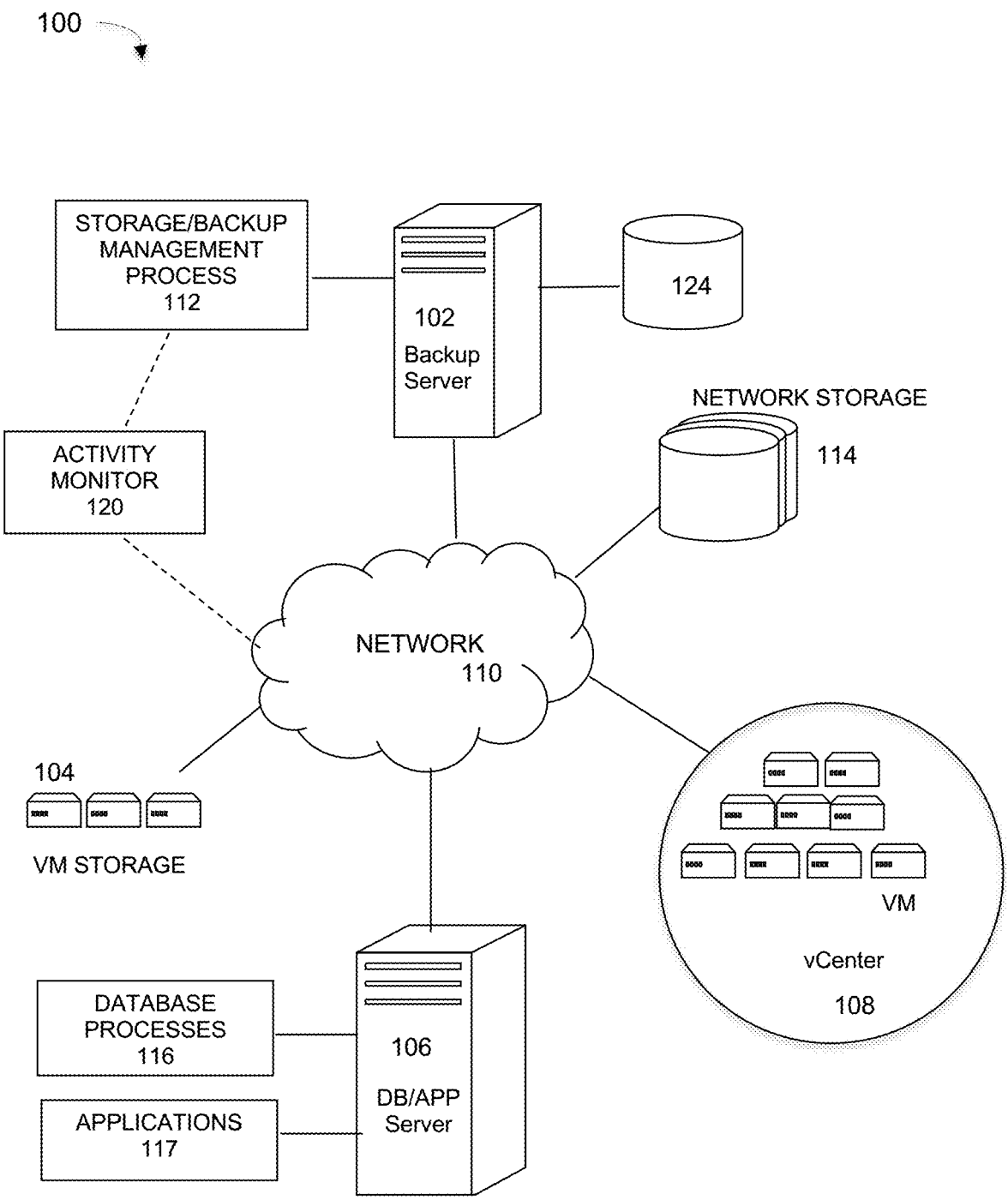
FIG. 1 is a diagram of a network implementing a comprehensive and intelligent network activity monitoring process, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for an intelligent monitoring, detection, and notification system or method that monitors key performance indicators (KPIs) and other metadata, as well as visualizations, to enable users (e.g., system administrators) to detect and understand the anomalous behavior of application execution and/or data flow in their environments. In the context of a data backup system, such embodiments monitor a specific backup environment for anomalies, group/classify those anomalies, and displays the results in a manner that enables a backup administrator to be identify and address issues that may impact service level agreements (SLAs), and other defined performance requirements.

FIG. 1 illustrates a computer network system that implements one or more embodiments of a network data backup system implementing an intelligent activity monitoring process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment. The database server can be a single machine or a cluster. The data sourced by the data source may be any appropriate data, such as database 116 data that is part of a database management system or any appropriate application 117. Such data sources may also be referred to as data assets and represent sources of data that are backed up using process 112 and backup server 102.

The network server computers are coupled directly or indirectly to the network storage 114, target VMs 104, data center 108, and the data sources 106 and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may comprise at least part of a Data Domain Restorer (DDR)-based deduplication storage system, and storage server 102 may be implemented as a DDR Deduplication Storage server provided by EMC Corporation. However, other similar backup and storage systems are also possible.

Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud networks, it may be provided by a cloud service provider server that may be maintained be a company such as Amazon, EMC, Apple, Cisco, Citrix, IBM, Google, Microsoft, Salesforce.com, and so on.

In most large-scale enterprises or entities that process large amounts of data, different types of data are routinely generated and must be backed up for data recovery purposes. In a deduplication backup system, for example, such data can be subject to a high degree of processing by routines such as compression, hashing, index comparisons, and so on. With large amounts of data and relatively frequent backup periods, and the need for fast recovery processing in the case of emergency restores, proper execution and data flows are required. Any potential problem may manifest itself through behavior that is abnormal compared to routine processing, and various different characteristics, such as storage requirements, processor usage, deduplication rates, data throughput, and so on can be monitored to indicate system health and normalcy. Activity monitor 120 provides an intelligent monitoring, analysis, and notification tool to track network behavior, identify potential problematic conditions based on specific network environment characteristics, and notify the user in real time of any problematic behavior. For the embodiment of FIG. 1, the activity monitor 120 may be implemented as a component that runs within a data protection infrastructure, and can be run as an independent application or embedded into an instance of data protection software 112 or a data protection appliance. Any of those implementations may also be on-premise implementations on client machines within a user's data center or running as a hosted service within the cloud.

Figure 2:
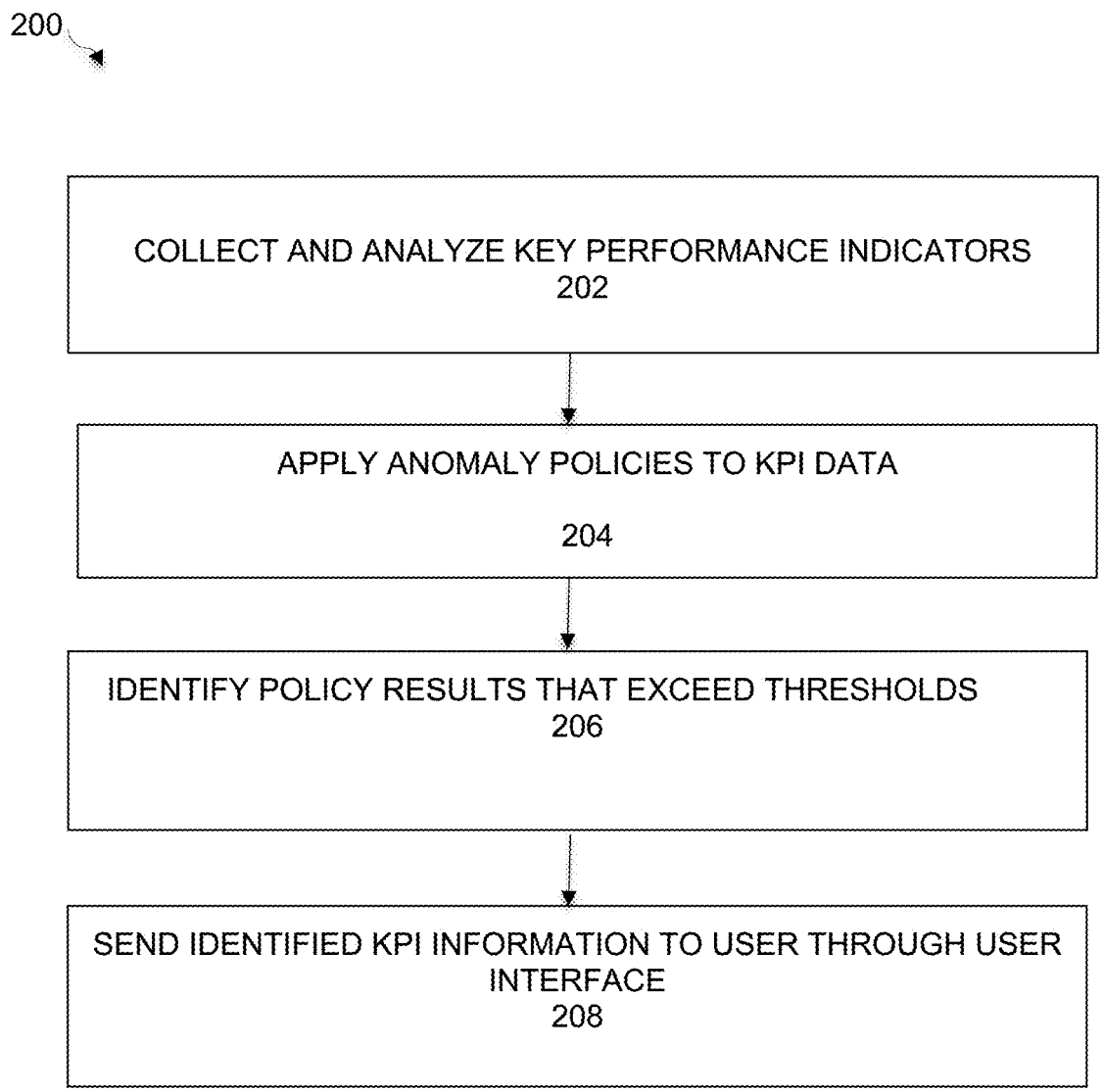
FIG. 2 is a flowchart that illustrates an overall method of monitoring and reporting network activity, under some embodiments.

FIG. 2 is a flowchart that illustrates an overall method of monitoring and reporting network activity, under some embodiments. As shown in FIG. 2, process 200 first collects, persists analyzes key performance indicators (KPIs) for the network environment or for each monitored system, 202. The KPIs comprise individual and important metrics that are objectively measurable to provide values accumulated over time along a defined scale, and to show deviations relative to a baseline of the scale. Any type and number of appropriate indicators may be defined for each and any monitored system, and different systems or applications may use different KPIs.

Key performance indicators may be defined and well known according to industry standards or manufacturing or service practices for certain industries, while others may be user defined, and a user interface console may be provided to allow a user to easily define their own KPIs. Key performance indicators are collected for assets in the system or other discrete units of activity that are performed or processed that are defined or considered of interest in the system. In the context of a backup application, KPIs are collected for assets that comprise any data that a user wants to backup for storage and/or restoration purposes. Such assets can be individual files, file directories, file systems, databases, and so on. Such assets may be defined by the or by the applications that process the data.

FIG. 3 illustrates example KPIs for a deduplicated backup and recovery system in an example embodiment of the backup system of FIG. 1. As shown in FIG. 3, table 300 lists certain defined metrics 302, such as CPU utilization, memory usage, number of restores on an asset, throughput (KB/s), backup duration, deduplication ratio, amount of backup data, recovery to unique location, and user defined metrics. These metrics may be divided or organized into subsystem or metadata type, such as asset metadata 304, network metadata 306, backup metadata 308, and user customized metadata 310. Each row of table 300 represents a separate KPI, and the data collected for each KPI is provided in a defined scale of values. To provide effective analysis and notifications, certain threshold values 301 or normal/abnormal operating ranges are defined for each KPI, along with an algorithm (system or user supplied) that dictates how to analyze the KPI values. FIG. 3 is intended to be an example of certain KPIs shown in tabular form, and that are system internal settings that users will define.

As shown in the example of FIG. 3, certain problematic conditions may be reported for excessive CPU or memory usage, such as the indication of two SD (standard deviations) over 30-day average for these KPIs, or an excessive number of restores on an asset, and so on. Each of these anomalous conditions may point to a specific reason that indicates excessive resource use such as due to failing equipment or system bottlenecks, improper or dangerous behavior such as data theft, resource hijacking, and so on.

For the backup system use case, the KPIs can include parameters or metrics such as general system metrics of CPU utilization, memory usage, disk usage, disk I/O, network utilization; and specific application metrics of the amount of data backed up, the deduplication ratio, backup speed, and other relevant metrics. These KPIs thus cover and combine both general system and application specific characteristics to provide a comprehensive picture of an overall environment. Through the storage of past anomaly data, the system provide the basis for comprehensive and detailed reporting of historical trends with respect to resource usage and issues.

The key performance indicators of Table 300 are provided for purposes of example only, and as stated above, additional or different KPIs may be used for this application/environment or for any other monitored system.

With reference back to FIG. 2, once the KPI data is collected and analyzed (202) process 200 then determines which anomaly detection policies should be run. Each of the algorithms are executed using the collected KPIs by applying the anomaly policies to the KPI data, 204. In an embodiment, an anomaly policy comprises an algorithm, KPIs, defined thresholds, assets, and notification rules, as will be described in further detail below. The results policy application are then analyzed to determine if any of them exceed the defined thresholds, 206. Notifications are sent out to users, 208. In an embodiment, process 200 additional information, such as application context, system state, or historical data to tailor or change the information sent to the user.

Figure 4:
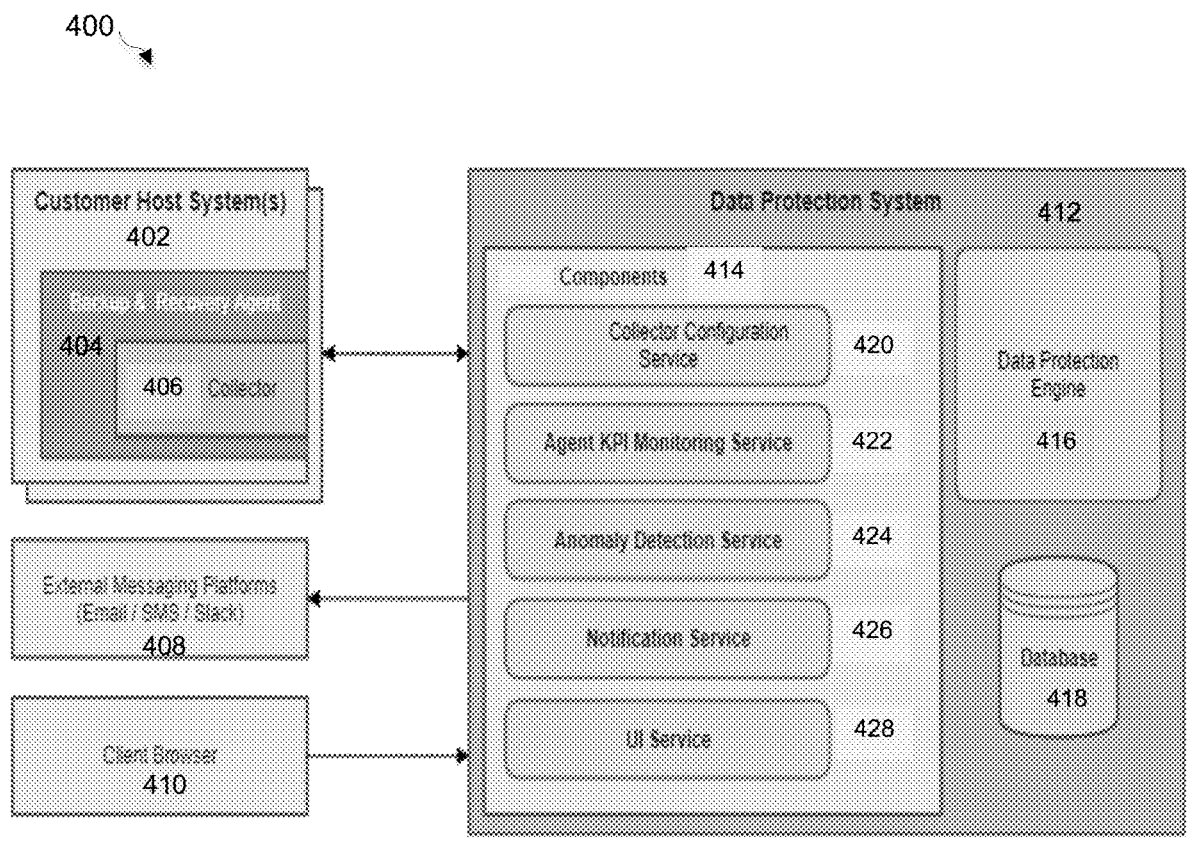
FIG. 4 is a block diagram showing components of an intelligent activity monitor component for use in a backup system, under some embodiments.

FIG. 4 is a block diagram showing components of an intelligent activity monitor component for use in a backup system, under some embodiments. For the example embodiment shown, system 400 may constitute or comprise at least part of component 120 in FIG. 1. Corresponding to certain components that may be shown in FIG. 1, system 400 includes one or more customer host systems 402, each of which has installed a backup and recovery agent 404 with a collector component 406. The host system 402 is coupled to a data protection system 412 that includes a data protection engine 416 and a database 418 that contains certain data for the system. Backup activities are scheduled and configured in the data protection system 412, and when a backup activity is running and completed, the system collects the necessary KPI data from the data protection engine 416. The data protection system 412 also includes several components 414 that work with the backup and recovery agent 404, as described in further detail below.

The collector 406 runs inside the deployed backup and recovery agent 404 and is deployed on each customer's host system 402 that contains the assets that are being protected. This component 406 collect the KPIs (e.g., 300) that have been configured and send them to the KPI monitoring service 422 in the data protection system 412. The KPI monitoring service 422 receives the KPI messages sent from the collectors 406, and may perform any data translation or additional database queries needed in order to send a KPI data event. In addition, it will persist the KPI information in the database 418. The collector configuration service 420 is used to communicate configuration changes to the collector 406. Any configuration changes made by the user, such as through user interface (UI) service 428 will be either pushed by the collector configuration service 420, or pulled by the collector 406.

The anomaly detection service 424 manages and detects anomaly alerts. Anomaly detection scans are triggered by KPI events received from the agent KPI monitoring service 422, such as from a configured schedule or from an on demand request. This service 424 publishes an application programming interface (API) that allows the system to: (1) receive anomaly alert acknowledgement requests; (2) start and get status and view report generation requests; (3) add, edit or delete anomaly detection schedules; (4) request an on demand anomaly detection policy run; and (5) view anomaly alerts. An anomaly detection scan performed by service 424 will combine KPI information with the rules and settings to run the anomaly detection policies to determine if there are any KPI threshold violations. Any threshold violation or violations will generate corresponding anomaly alerts. These alerts will be persisted in the database 418 and an anomaly alert event will be sent to the notification service 426 and UI service 428.

The notification service 426 listens for new anomaly alert events and runs the notification rules to determine the necessary notification messages that need to be sent out to the various user or users through any external messaging platforms 408, such as e-mail, short message service (SMS) messages, text alerts, Slack, and so on. Any appropriate messaging platform or service may be used depending on the overall environment. The UI service 428 is used to host the system UI, and will handle certain specific UI and HTTP based APIs, such as: (1) dashboards, widgets, and other UI components needed to present the anomaly information; (2) wizards and other configuration screens; (3) listeners for anomaly alert events in order to notify connected users; (4) user acknowledgement of anomaly alert events that have been triaged; and (5) report generation, viewing, and transportation.

FIG. 4 thus illustrates a distributed processing system example in which backup and recovery agents are extended with a collector component that collects and transmits the KPIs, and hosts have a collector installed to perform reporting and notifications. These functions may be provided or integrated differently depending on specific network topography, system requirements, and so on.

Figure 5:
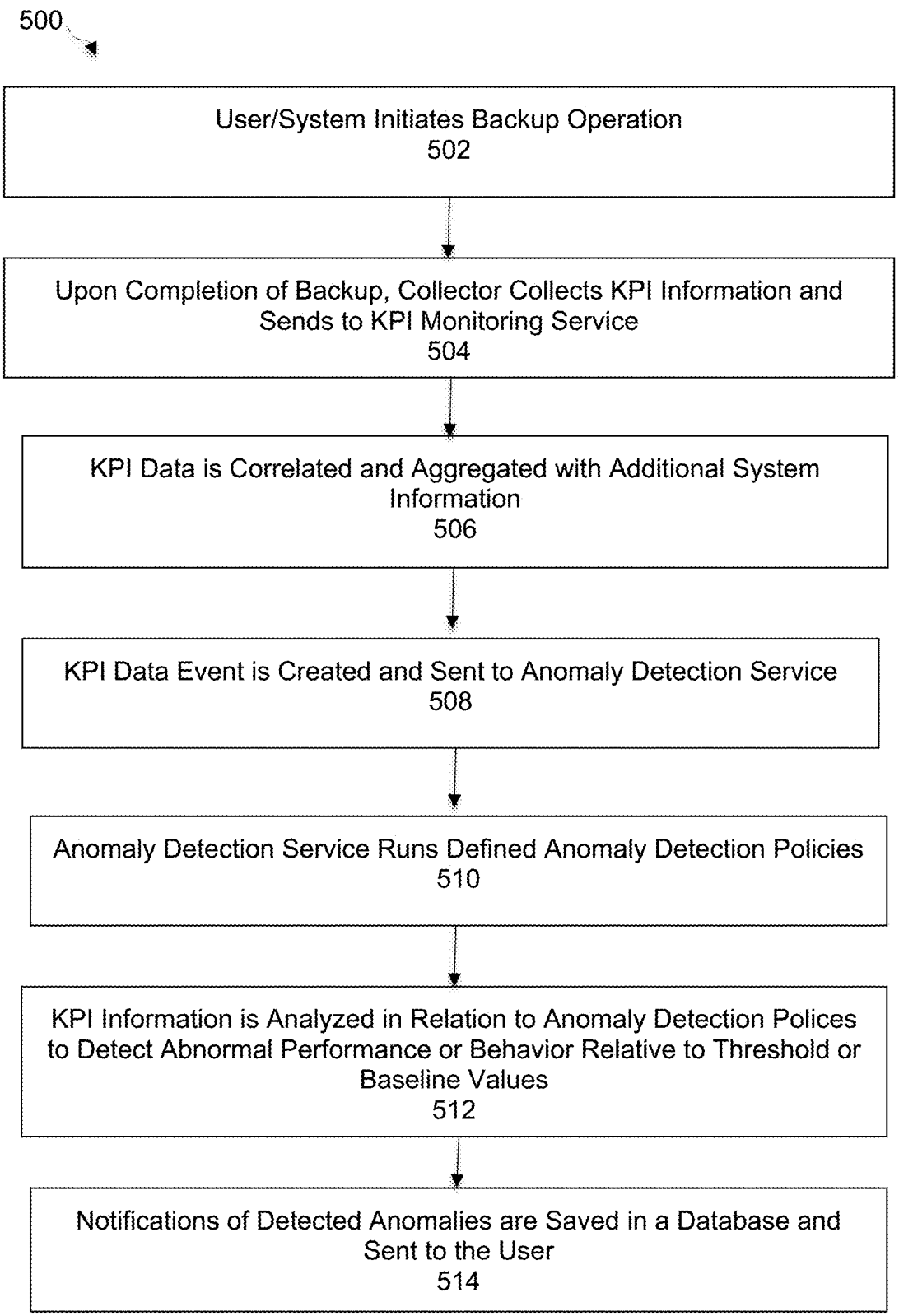
FIG. 5 is a flowchart that illustrates a method of monitoring system performance and notifying users of detected anomalies, under some embodiments.

FIG. 5 is a flowchart that illustrates a method of monitoring system performance and notifying users of detected anomalies, under some embodiments. Although embodiments will be described with respect to data backup applications, embodiments are not so limited. Any application that relies on normal, consistent behavior for deterministic response to users is suitable for use with the described embodiments. Large-scale data backup operations are described as one example of such an application and network environment. Certain process steps of FIG. 5 may be described in relation to hardware components illustrated in FIG. 4, and again embodiments are not so limited as other systems and/or components may also be used.

As shown in FIG. 5, process 500 starts with the initiation 502 of the backup operation (or any other computer application) that may be initiated by the user, or by the system, such as through a regularly scheduled backup or restore event. KPI data can be collected during or after backup operations, but analysis generally occurs upon completion. Various KPI information will be captured by the collector 406 in the user host system 402, and sent 504 to the agent KPI monitoring service 422. The data is then correlated and aggregated 506 with additional data that is obtained from the data protection engine 416, and the database 418. The additional data generally represents environmental data that is not represented or captured in a KPI, and can include application context, system state information, historical data, and the like.

In step 508, a KPI data event is created and sent to the anomaly detection service 424. The anomaly detection service receives the KPI data event information and runs 510 the required anomaly detection policies. These policies are defined and generated as described in greater detail below. The policies are used to analyze the KPI data event information to provide a detection of any abnormal or substandard performance of the application, 512. After analysis of the data, if an anomaly event is detected, an anomaly alert or notification will be created and saved in the database 418. In addition, the detected anomaly alert events will be sent out 514 to the user via the notification service 426 and the UI service 428.

In an embodiment, the notification service 426 looks at the configured notification rules and sends out the appropriate notification messages based on the detected anomaly and user/system characteristics. A variety of notification platforms could be configured such as email, text messaging (SMS), Twitter, or any other suitable communication platform or means. The UI service 428 can send an alert notification to any currently logged in users.

In an embodiment, the system monitoring and anomaly detection process 500 is performed as an automated process that may run as a background task. In some situations, the system may be configured to run the anomaly detection on demand, rather than as an automated process. In this case, the user, such as through client browser 410 will send an on-demand request to the UI service 428. The UI service will then forward this request to the anomaly detection service 424. In addition, an administrator can setup scheduled times for an anomaly protection policy to be run. Such scheduled times may be periodic (e.g., every week/month, etc.) or based on events (e.g., after every second backup, etc.).

Figure 6:
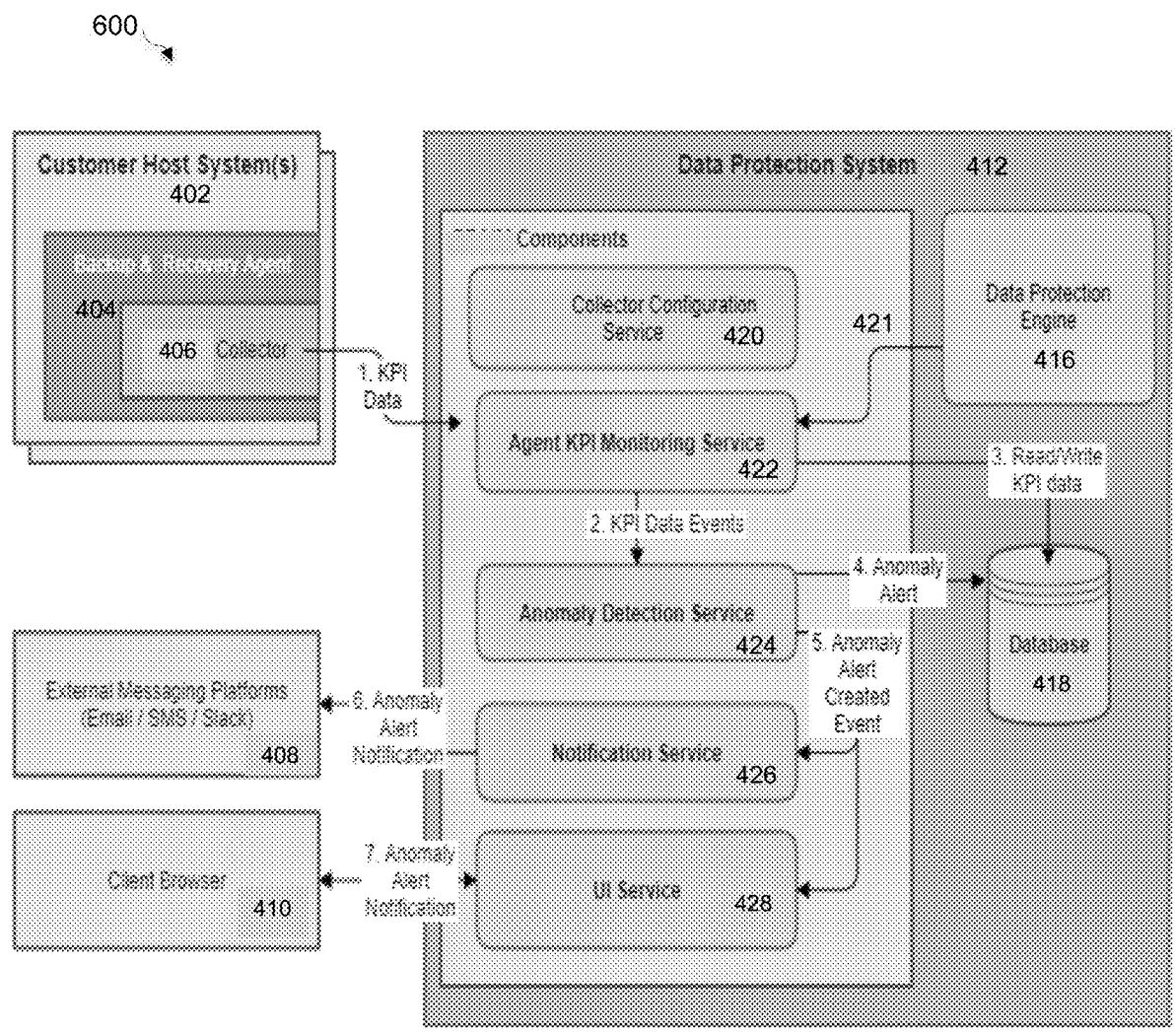
FIG. 6 is a combination block and flow diagram that illustrates movement of KPI information and anomaly alerts for the process of FIG. 5 and system of FIG. 4, under some embodiments.

FIG. 6 is a combination block and flow diagram that illustrates movement of KPI information and anomaly alerts for the process of FIG. 5 and system of FIG. 4, under some embodiments. As shown in diagram 600, the data protection engine 416 works with the backup and recovery agent 404 to execute a backup operation that is monitored by the KPI monitoring service, 422. KPI data (1) is sent from collector 406 of the backup and recovery agent 404 of host system 402 to the agent KPI monitoring service 422 of data protection system 412. Any additional data 421 (e.g., state, historical, context, etc.) that may be compiled or stored in the data protection engine 416 can also be sent to the monitoring service 422. KPI data events (2) are sent from the KPI monitoring service 422 to the anomaly detection service 424. The KPI data is also stored in the database 418. The anomaly detection service 424 processes the KPI data events and defined policies to identify any conditions that would generate an anomaly alert (4). Any such alert is stored in database 418, and an anomaly alert created event (5) is sent to both the notification service 426 and UI service 428. The notification service 426 sends an anomaly alert notification (6) to external messaging platform 408, while the UI service 428 sends its anomaly alert notification (7) to client browser 410.

In an embodiment, system 400 can allow a user to make configuration changes to the system via the UI and hosted by the UI service. A configuration change that requires the collector to make changes would start in the client browser 410, the change would be sent via an HTTP message to the UI service 428. After internal processing, the UI service would create an augmented change request to the collector configuration service 420. This service will then persist the change in the database 418 for use by the collector 406, UI service 428, or notification service 426 depending on the requested change. When the collector 406 receives the notification, it will process the configuration changes needed to satisfy the user's changes.

In an embodiment, system 400 also includes an anomaly alert event acknowledgement function. Using this function, users will be able to triage anomaly alert events in order to know which alerts have been viewed. This is done by first issuing a view anomaly alert request from the client browser 410 through the UI service 428 to the anomaly detection service 424. This service then queries the database directly for requested alerts. In this embodiment, a record of previously triaged events is kept in database 418 for a user configurable amount of time for audit and historical purposes. In addition, the triage will allow adding comments, pre-configured responses, and other settings. This will enable users to view historical data and have helpful information to remember what work may have been done in order to close a particular anomaly alert.

In an embodiment, the UI service 428 allows a user to view configurable dashboards and reports for each of the monitored assets. This will quickly show the assets that are in a critical or warning threshold alert state. The UI service 428 will proxy report requests to the anomaly detection service 424. This service will then pull the necessary KPI and anomaly alert event data from the database 418 in order to generate the necessary report data. This data will be returned to the UI service 428 that will convert the data into the necessary presentation view for the user to view through their browser 410.

As described above, policies are applied to the KPI data to determine the presence of anomalous or abnormal operating conditions or program execution. In an embodiment, a policy is a data element that is processed by the anomaly detection service 424 and applied against the KPI data to identify anomalous conditions for the eventual generation of notifications by the notification/UI services.

Figure 7:
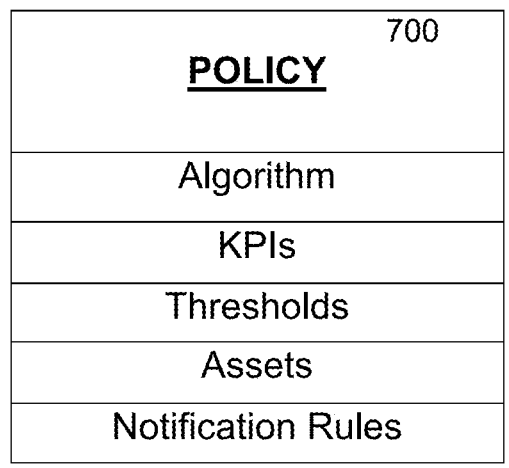
FIG. 7 is a table illustrating the composition of an example policy, under some embodiments.

FIG. 7 is a table illustrating the composition of an example policy, under some embodiments. As shown in FIG. 7, each policy 700 will specify a specific algorithm, the KPIs that the algorithm is applied to, the threshold values that trigger alerts, the assets, and the notification rules to notify the user. FIG. 7 illustrates one example of a policy constituents and other policy definitions are also possible.

Figure 8:
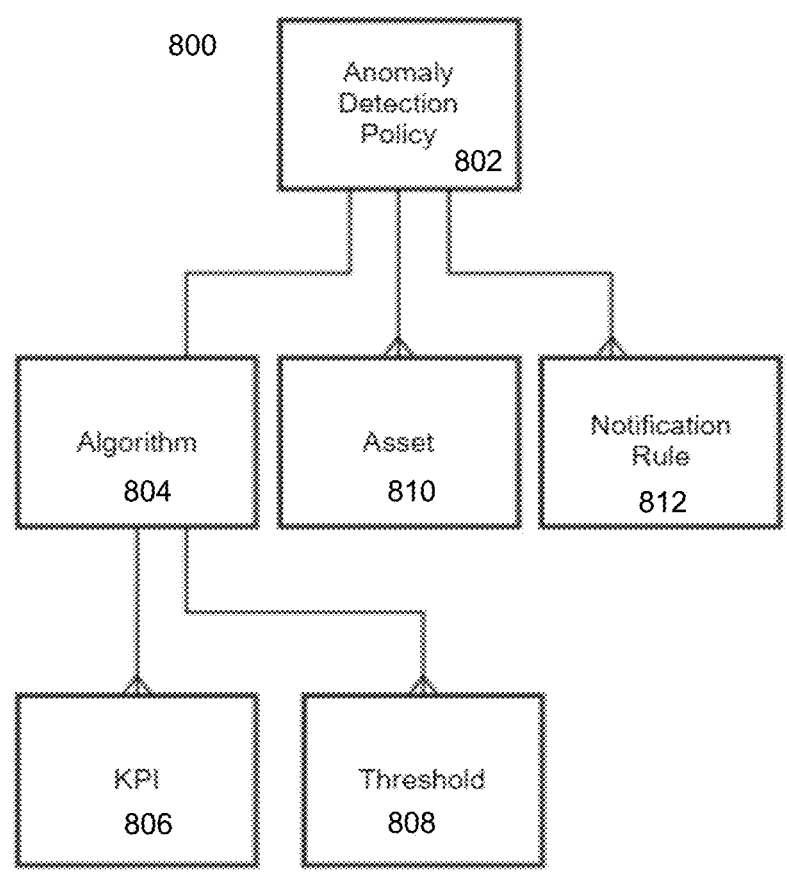
FIG. 8 illustrates an entity relationship diagram for an anomaly detection policy, under some embodiments.

An anomaly detection policy 700 applies an algorithm to one or more assets to generate one or more notification rules. FIG. 8 illustrates an entity relationship diagram 800 for an anomaly detection policy, under some embodiments. As shown in FIG. 8, each anomaly detection policy 802 has a single algorithm 804, one or more assets 810, and one or more notification rules 812. The algorithm 804 itself works on KPIs 806 and threshold values 808. An anomaly detection policy will combine the selected algorithm with one or more assets, and one or more notification rules, and execute the algorithm on the KPIs and threshold values to determine if any thresholds are exceeded for an asset, thus necessitating notifying the user. The execution of a policy is triggered by either a backup event, a scheduled event, or an on demand request. When triggered, the policy will determine which assets 810 should be scanned for anomalies. If any anomalies are detected with the scan (based on exceeding thresholds 808), then the notification rules will be executed and the notifications will be sent as per the notification rule 812.

In an embodiment, the algorithm 804 used by a policy is a data algorithm that processes the KPI data against the preset threshold values for an indicator. One of several different algorithms may be used. The first is a simple comparison algorithm that checks the current data value of an indicator (e.g., disk usage, memory usage, CPU percentage, etc.) against the corresponding threshold value. Other algorithms include moving average, predictive algorithms (e.g., ARIMA), auto regressive, exponential smoothing, and any other similar algorithm. The system may be configured with a number of pre-defined algorithms, or it may be configured to allow a user to customize an anomaly detection algorithm to fit their network environment and applications.

System 400 includes certain anomaly detection policy management procedures to allow a user/administrator to manage the policies that are used to alert users to abnormal conditions that require attention. In an embodiment, these include certain UI tools that allow the user to specify policy definitions, asset definitions, and notification mechanisms. These tools can include data entry display windows and user input areas that help the user step through the required inputs through wizards or other prompt-based input.

Figure 9A:
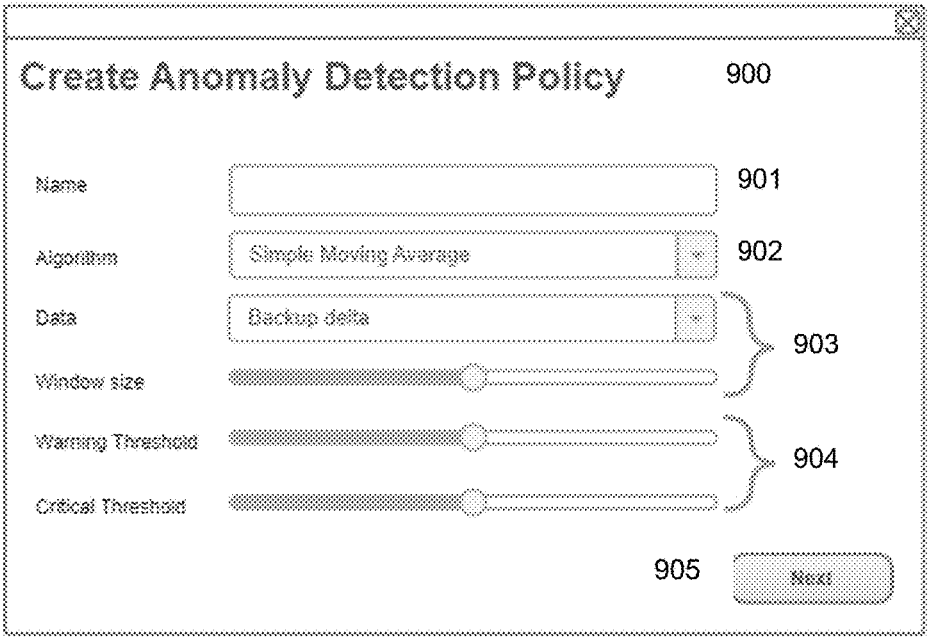
FIG. 9A illustrates an example UI display for defining a policy under an embodiment.

FIG. 9A illustrates an example UI display for defining a policy under an embodiment. This definition page allows the user to enter the metric (KPI), algorithm, and thresholds to be monitored. For this example, display screen 900 includes several fields such as a name field 901 for input of a customizable name for the policy. Algorithm entry filed 902 selects the anomaly detection algorithm used (e.g., simple comparison, simple moving average, etc.). The data and window size 903 allow the user to configure the parameters required for the algorithm. These entry areas may change depending on the selected algorithm. The threshold value or values for warning and error notifications are set in area 904. Any number of threshold values may be defined depending on the notifications desired. As shown in the example, certain values may be entered relative to a sliding scale from high to low, 0-10, etc. Alternatively, numeric or percentage values may be directly entered.

Figure 9B:
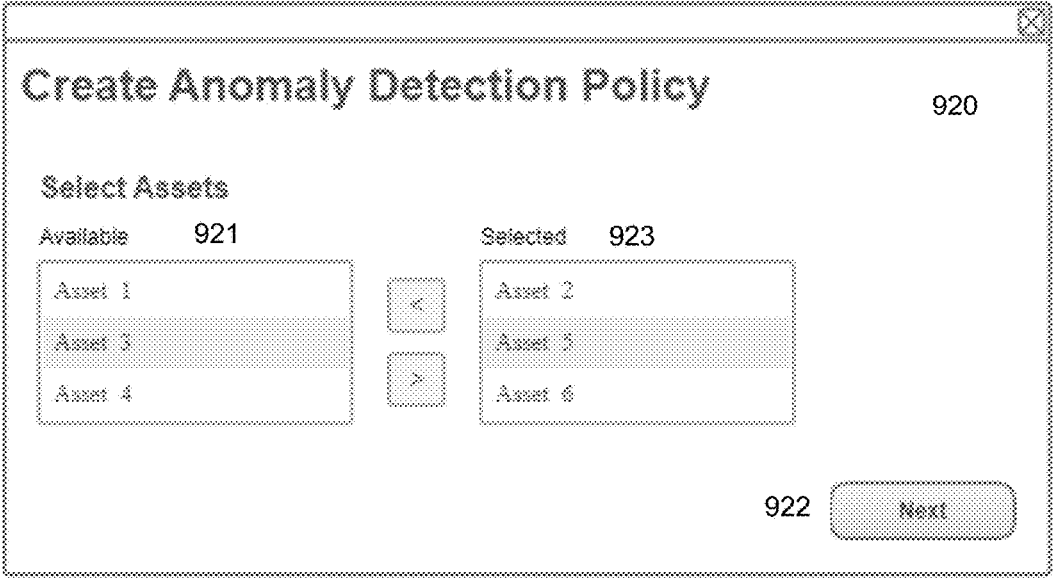
FIG. 9B illustrates an example UI display for defining assets under an embodiment.

After the policy is defined, the assets to be monitored by the policy must be defined. FIG. 9B illustrates an example UI display 920 for defining assets under an embodiment. This definition page allows the user to enter the metric (KPI), algorithm, and thresholds to be monitored. As shown for the example of FIG. 9B, selected assets 921 are selected from a list of available assets 921.

Figures 9C, 10:
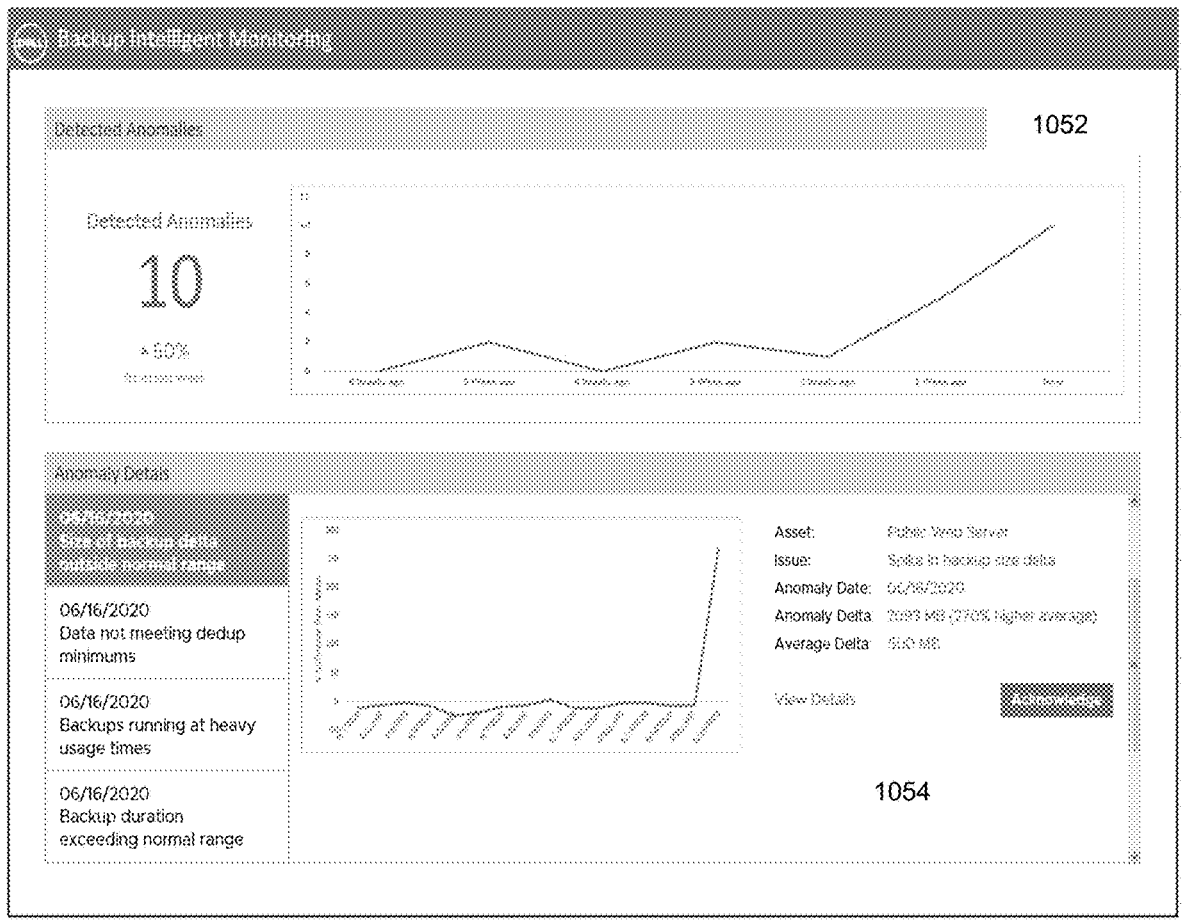
FIG. 9C illustrates an example UI display for defining user notifications under an embodiment.
FIG. 10 is an example user interface display for a report of detected anomalies under an embodiment.

After the policy and assets are defined, the notifications must be configured. FIG. 9B illustrates an example UI display 930 for designating users to be notified, how they are notified, and which threshold was exceeded for the specified policies and assets. As shown in FIG. 9C, users can add one or more notification configurations though button 931. The threshold area 932 allows users to select the threshold values that result in alerts being generated. This can be along a relative scale of seriousness, such as 'warning' or 'critical' and so on. The specific users to receive the notification can be designated in area 933, and the notification type (e.g., mail, SMS) can be defined in area 934. Thus, alerts for reaching different thresholds can be sent differently (e.g., warning thresholds are notified through a browser, but critical thresholds are sent in real time to the appropriate users). The 'Actions' 935 allow a user to edit or delete a particular configuration item. Depending on system complexity, the detection policy can be tailored to send only certain alerts to certain users or different types of alerts for different types of alerts, and so on.

As stated above, the policy detection process may be driven by a UI process wizard that guides a user through the various definitions and UI input screens, such through the use of 'next' buttons 905, 922, and a 'finish' button 936.

All assets that have the required KPI collector 406 installed and along with any other requirements, will automatically be included in applicable policies by default. Administrators will not need to change these unless they want to customize the system for their environment. In addition, they will be able to add their own policies with new KPI combinations, assets, and so on.

Effective notification to users of alerts generated for detected anomalous conditions is an important aspect of system 400. In an embodiment, system 400 includes mechanisms to track and store KPI and anomaly data over time to allow users to generate meaningful reports that illustrate system behavior or trends in anomalous conditions. In a backup environment, this involves tracking the size of the backed up assets and storing the metadata for size deltas of the backed up systems. This allows the system to automatically calculate average differences, and other trend data, and identify anomalies that should be raised to the user's attention.

FIG. 10 is an example user interface display for a report of detected anomalies under an embodiment. Such a display can be provided through widgets in a product dashboard or similar UI mechanism. The example of FIG. 10 highlights the rate of detection for detected anomalies and the change in anomalies over time. The dashboard can also provide an overview of the detected anomalies, display area 1052. In this container anomalies would be listed from most to least recent. Each anomaly would have a graph illustrating the anomaly and related information (e.g., average and anomaly values). The users can also acknowledge anomaly events or view more details (such as through a link that will navigate them to a page or model that shows more detail about the selected anomaly. For the example of FIG. 10, if the user selected to 'View Details' for the anomaly 'Size of backup delta outside of normal range' they would be shown the graph in display area 1054.

Figure 11:
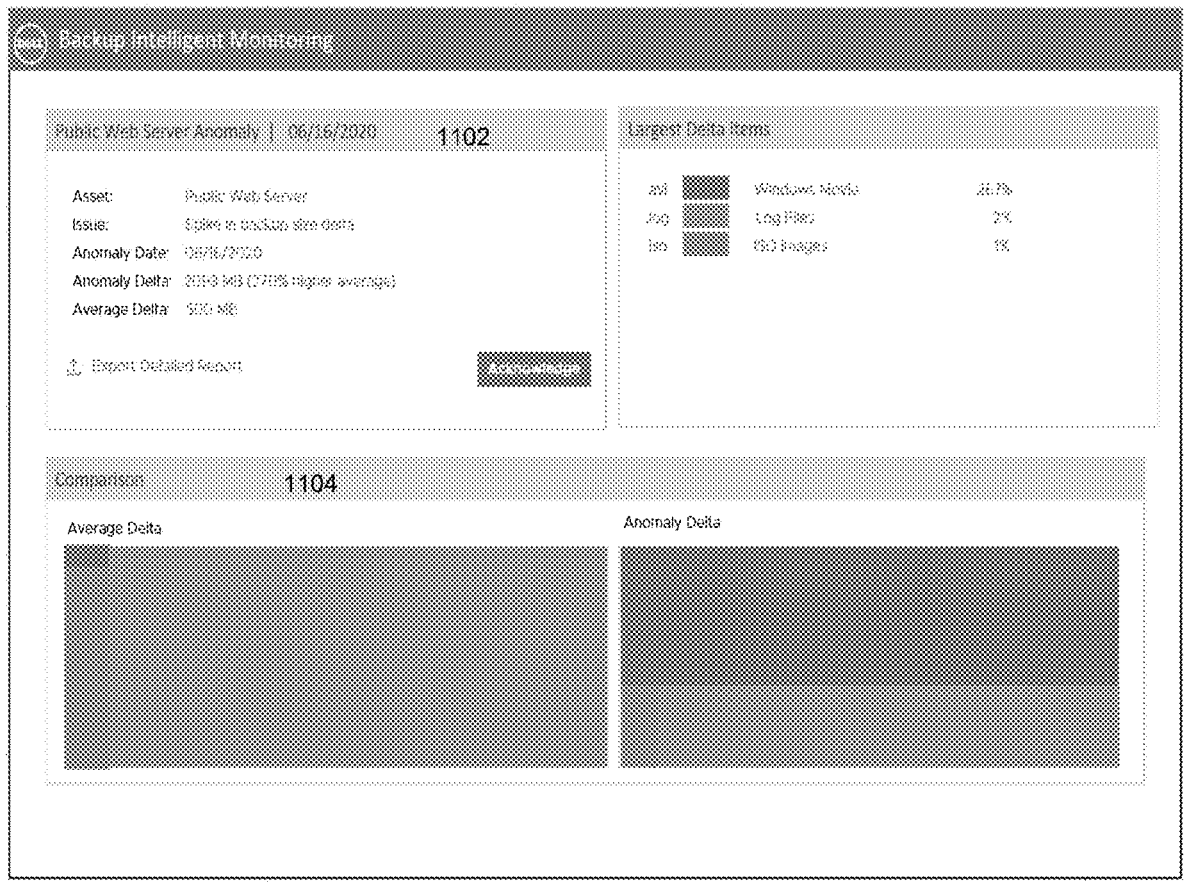
FIG. 11 is an example user interface display for showing detailed information for a report of detected anomalies under an embodiment.

Any drastic change, such as the upward spike in the graph shown in window 1054, can indicate a change in operating conditions due to a potentially dangerous reason, such as unauthorized access, hacking, etc. For this, system 400 provides additional reporting capabilities to provide detailed information that may be compiled from information stored in the database 418. FIG. 11 is an example user interface display for showing detailed information for a report of detected anomalies under an embodiment. In the example of FIG. 11, the specific anomaly 1102 has detailed information showing an example that a web server's backup size drastically increased (e.g., by 270%) and how that increase varied depending on file types. A comparison display area 1104 may be provided to show differences in behavior for the relevant KPI. In this example a certain display indicator shows the change in delta size of .avi files between the average delta (in which it makes up a very small amount) and in this anomaly event in which .avi files make up 267% of the delta increase. Seeing this size/file type difference over time gives a visual indicator to the user that the delta backup size is out of the norm and that .avi files have drastically increased on this system. Such an event may have been due to storage on the system of unauthorized video content (e.g., downloaded movies). The monitoring and notification system 400 can efficiently alert the admin about the depth and nature of such an intrusion, thus saving significant time and resources, e.g., legal, regulatory, etc.

Embodiments can be extended to allow a user to select from a set of data algorithms in order to alert an administrator about unexpected future, as well as current, usage. Such alerts are referred to as 'prospective' alerts and use predictive algorithms. Each predictive algorithm takes a data input (bandwidth usage, data size change, CPU usage, etc.) and optional settings such as time period, and lookback window to predict a future value in a future point in time along with a confidence interval. The further out in time that is selected (e.g. one week from now versus one year from now), the less reliable the resultant forecast that will be generated. Some algorithms produce a confidence score (typically 0 to 1) that indicate the reliability of the result and a range. For example, if disk usage is being analyzed, a prediction algorithm could produce a result that looks like a cone.

Figure 12:
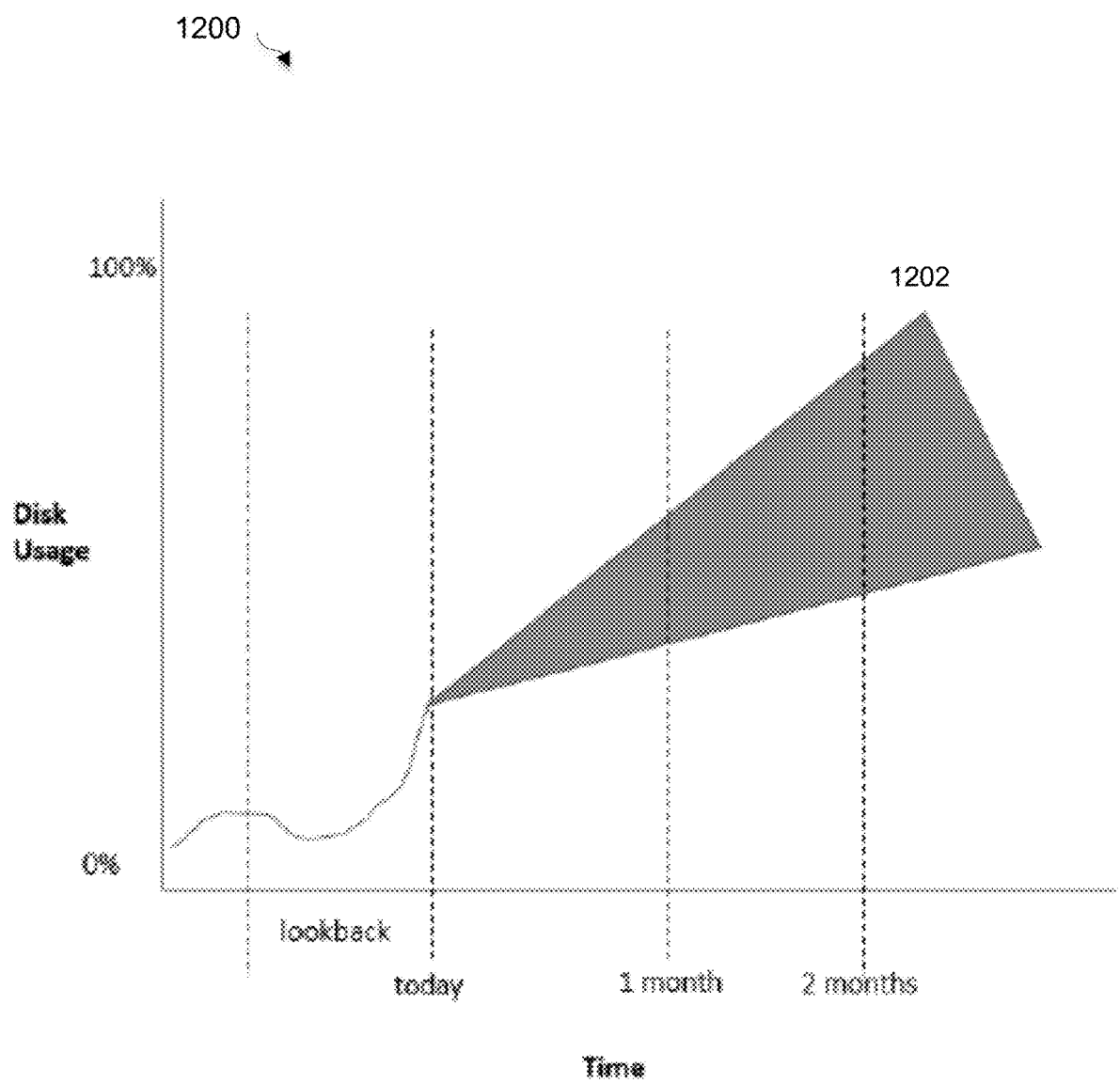
FIG. 12 illustrates an example report for projected disk usage under an embodiment.

FIG. 12 illustrates an example report for projected disk usage under an embodiment. The example of FIG. 12 shows a distribution 1200 of disk usage over time, in which disk usage can be analyzed from today using a particular lookback period (e.g., one month). The example plot 1202 shows that present disk usage ('today') is about 30%, while the prediction for 1 month is between 35% and 55% with a confidence value of 0.85 (not shown), and the prediction for 2 months out is 45% to 80% with a confidence interval of 0.70. Therefore, the future time point can be expressed as a confidence score and an upper and lower value, that is, the furthest point in time in the future where the algorithm can provide a 95% confidence score. This also allows a user to select a future time point and be provided a range of values and a confidence score.

The prospective analysis can also be used to generate different alerts. For example, a present alert may read something like "Critical alert—disk usage exceeded 750 MB limit for asset inventory-sill-prod." Such an alert can be generated by a simple comparison to threshold and capture only current KPI data. A prosper prospective alert may instead read something like "Warning—memory usage expected to exceed 12.5 GB in 30 days for asset images-filesystem." Such an alert would be generated by a predictive algorithm.

Monitoring User Activity for Anomalous Behavior

Besides the backup operation and network behavior describe above, another source of information that might indicate the potential for data attacks or vulnerabilities is the behavior of the users themselves. Embodiments of the activity monitor 120 Additionally, track the behavior of users to detect anomalous system behavior from this angle to generate alerts to potential data vulnerability.

Different users naturally have different behavioral patterns and tracking individual user behavior is a means to detect normal versus abnormal activities and actions for an individual. By analyzing and monitoring behaviors on a user basis, system 100 can detect when uncommon activity has occurred and trigger alerts based upon anomalous human behaviors. The benefit of alerting on these behaviors are numerous and can include early detection of a security breach to highlighting suspicious and uncharacteristic employee actions.

FIG. 13 is a flowchart that illustrates a method of monitoring user behavior to detect possible data threats, under some embodiments. Embodiments described above provide detailed explanation of collecting, persisting, and analyzing KPIs for monitored backup/recovery systems with respect to detecting anomalous backup characteristics, such as file type composition and magnitude of a backup changes, among others. Process 1300 adds the behavior of end users themselves to the KPI processing. KPIs are attuned to user behaviors, such that when monitored for activities outside of normal patterns of behavior, alerts are sent to security or admin personnel regarding this potential suspicious behavior. For example, if a previously inactive user suddenly logs in and begins deleting large quantities of backup files, the algorithm would detect that abnormality. It should be noted that detecting problems with backups is a reaction to a problem, while extending the detection to user behavior allows for early detection that can result in the prevention of a problem caused by users.

Process 1300 of FIG. 13 begins with tracking user behavior in the system to establish norms and baseline behavior, 1302. The tracked users may comprise all users in an organization, department, facility, and so on, or any defined sub-group of users in an organization. Standards of normative behavior may be defined the same for all users, or they may be differentiated based on types of users. For example, temporary or special purpose staff may perform certain operations (e.g., backups, deletions, etc.) with much more or less frequency than other users.

For user behavior, the system tracks various user activities such as those listed in Table 1400 of FIG. 14. As shown in FIG. 14, these example user behavior KPIs include frequency of login, length of access, activities, and role behaviors in a console. Other KPIs include login location and login failures noted. The KPIs listed in Table 1400 are provided for purpose of example, and embodiments are not so limited. Any other or additional user behavior KPIs (metrics) may be used to track and define abnormal user behavior within the system.

Tracking these KPIs allows the system to develop a baseline pattern of user behavior. For example, if a previously unused login is triggered by a user repeatedly logging into a console, this may be flagged as activity that should be alerted. Similarly, if a user suddenly changes from logging in for short periods of time (e.g., minutes) to much longer periods of time (e.g., hours), this may also be seen as suspicious and potentially dangerous. Users may also be normally associated with only certain tasks given their roles, locations, and usage history, so if this suddenly changes, these activities and role behavior changes may also be flagged. Repeated failed attempts to login or perform certain activities in the system may also be flagged. Many other similar user behavior KPIs may also be defined and used in process 1300.

The tracking step may be performed over any appropriate length of time depending on the number/type of users, configuration of the activity monitor, and the enterprise or organization itself. Scalar values may be gathered over time to quantify the behavior Normative or normal behavior for a set of users may be defined using any appropriate qualitative or quantitative measure, such by calculating average, mean or median values from these values.

After normal user behavior has been tracked and defined, the system continues monitoring the users and system to discover any abnormal user behavior, 1304. In an embodiment, threshold values or ranges can be defined to distinguish normal from abnormal behavior. Such thresholds may be discrete and universal for all users, or they may be variable depending on type of user, type of activity or behavior, and so on.

In an embodiment, normal behavior can be assigned a scalar value, such as a value of 5 along a scale of 0 to 10. Any substantial deviation, such as +2 standard deviations (or similar) along this scale may be defined as abnormal. Thus, if a user on average deletes 15 MB of data per week, this quantity may be assigned a value of 5 and a deletion of 25 MB may be quantified as a value of 7 along this scale, thus constituting abnormal behavior with respect to this activity. Any scalar or percentage value and deviation may be used to define normal and abnormal behavior based on specific users and activities.

If any abnormal user behavior is discovered, the system can generate alerts based on anomaly algorithms and user settings, 1306. As described above, alerting occurred when certain criteria was reached based on backup activities, and these alerts would be sent to all users that needed to be notified. For process 1300, the abnormal behavior is tied to a user and so alerts are sent to specific administration or security personnel, rather than to general users. Thus, for example, if an inactive user suddenly became quite active and started deleting large quantities of backup files, this behavior would trigger an alert that would be sent to security personnel and not to the offending user.

In an embodiment, the alert generation can be configured to provide alerts to any defined person or sets of people, such as determined by the system settings. For example, lower priority alerts perhaps might simply trigger only an email to the offending user to confirm that a detected event was part their normal behavior or was excused by a valid reason. This lower priority alert could be used in a scenario in which a user logs into the console from a non-typical network address (e.g., overseas). Thus, if the behavior abnormality indicates a potentially bad actor, then that user's behavior is in question and they would not receive an alert. However, if the behavior was more indicative of being hacked (e.g., a different country network address from normal) that user could be notified of the alert (similar to how banks directly contact customers when they detect suspicious activity on their accounts).

Various different alert messages can be sent by process 1300. Example alerts include:
 (1) New user with higher activity than most users
 (2) Previously inactive users with higher activity than normal
 (3) Activities outside normal or authorized behavior
 (4) User login from unusual location
 (5) User group added with many users to an enterprise management group The above list provides only some examples, and other alert conditions can also be used.

Alerts can be sent to the relevant personnel through a notification messages or a user interface service as at least one of: an e-mail message, a short text message, a social network message, console message, and a web browser based message. Alert messaging may be varied and ramped up depending on the severity of the alert, such as starting with a text message and then phone call or system-wide alert, and so on.

Figure 15:
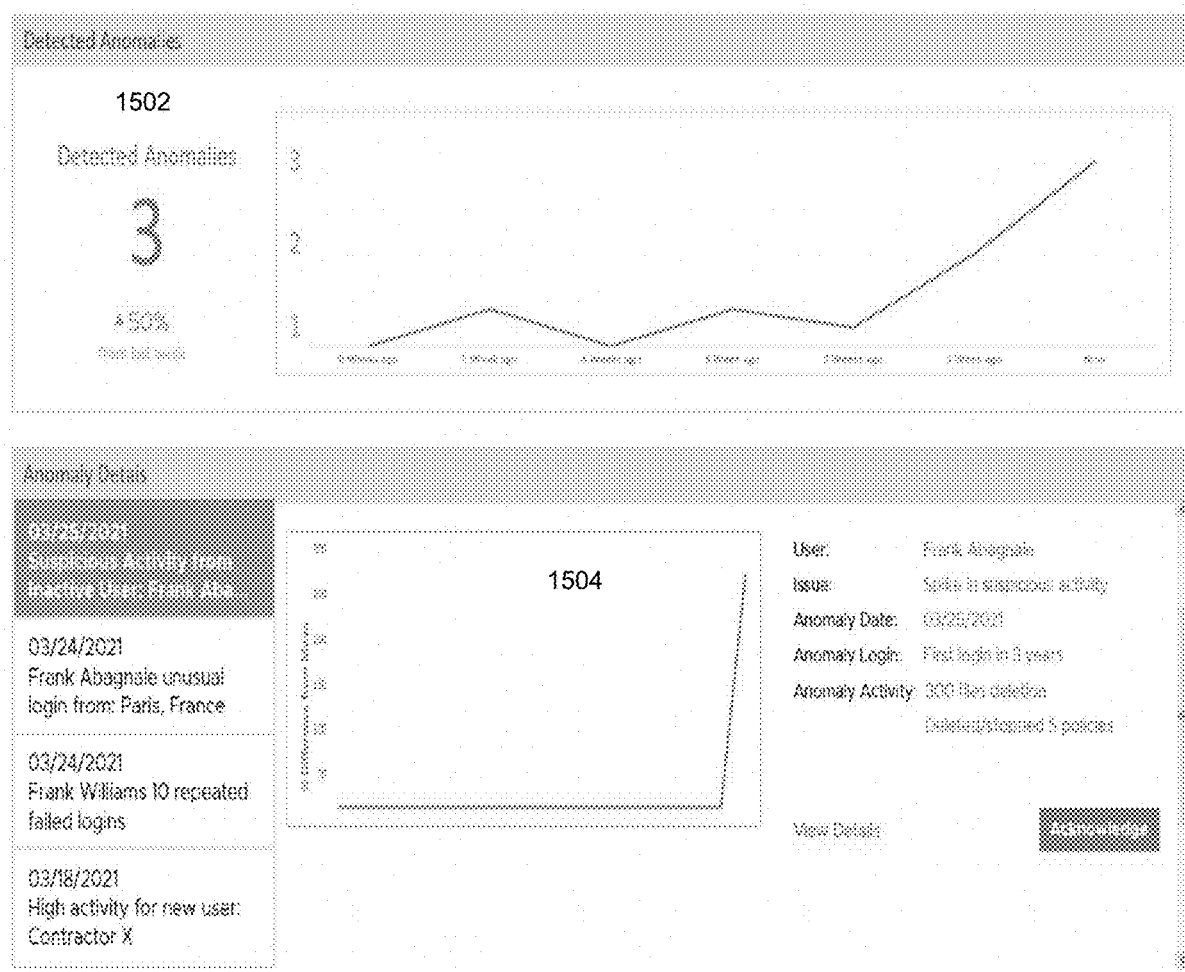
FIG. 15 is an example user interface display for a report of detected user behavior anomalies under an embodiment.

As in the backup monitoring embodiment described above, a comprehensive user interface can be provided to report detected user behavior anomalies, such as illustrated in FIG. 15. Such a display can be provided through widgets in a product dashboard or similar UI mechanism. The example of FIG. 15 highlights the rate of detection for detected user behavior anomalies and the change in such anomalies over time. The dashboard can also provide an overview of the detected anomalies, display area 1502. In this container anomalies would be listed from most to least recent. Each anomaly would have a graph illustrating the anomaly and related information (e.g., average and anomaly values). The users can also acknowledge anomaly events or view more details (such as through a link that will navigate them to a page or model that shows more detail about the selected anomaly. For the example of FIG. 15, if the user selected to 'View Details' for the anomaly 'Size of backup delta outside of normal range' they would be shown the graph in display area 1504.

Figure 16:
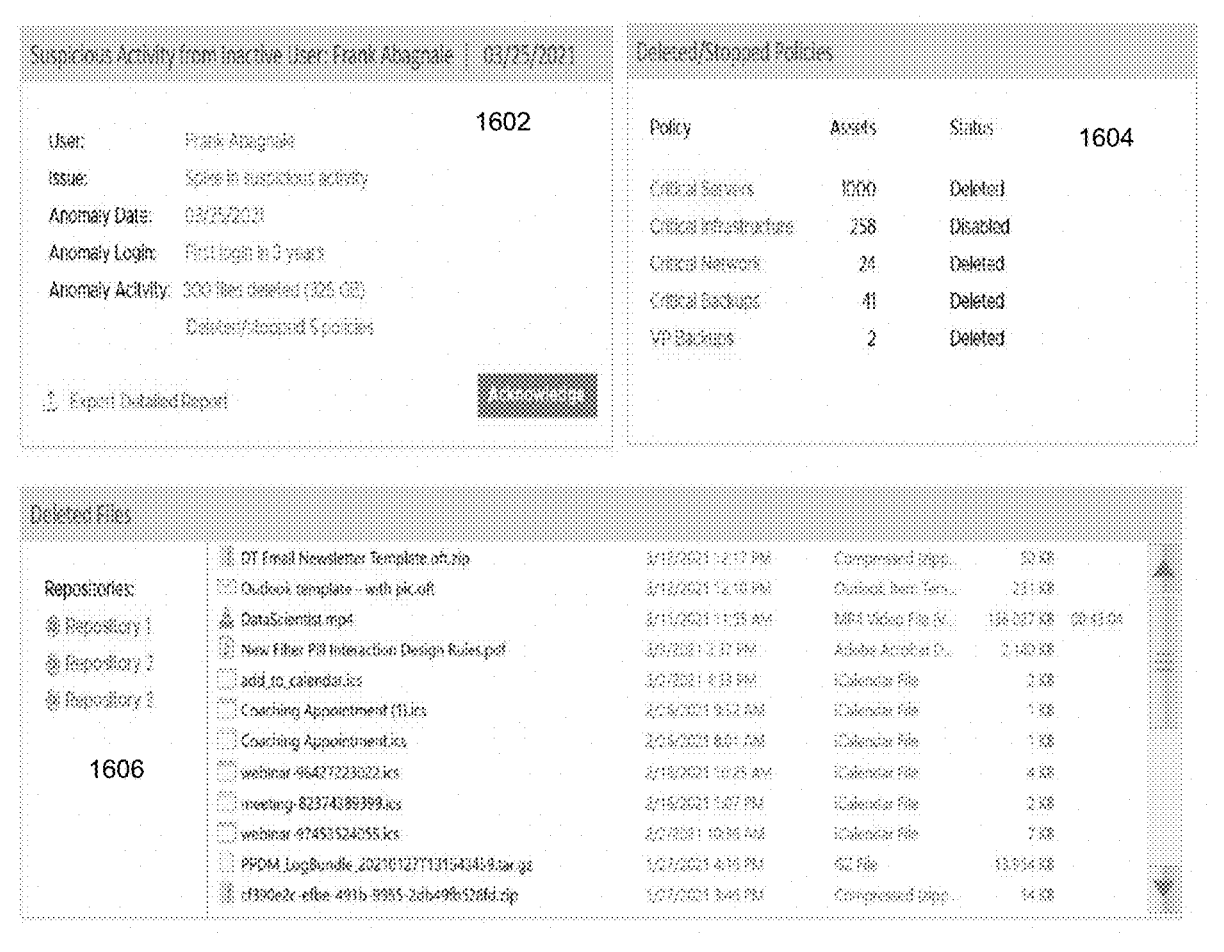

Any drastic change, such as the upward spike in the graph shown in window 1504, can indicate a change in user behavior due to potentially dangerous activity, such as hacking, data tampering/destruction, corporate espionage, and so on. FIG. 16 is an example user interface display for reporting detailed information of detected user behavior anomalies under an embodiment. In the example of FIG. 11, the specific anomaly display area 1602 shows detailed information showing an example that a certain user has logged in after a long period of inactivity and suddenly deleted a large number of files. The monitor process can detect this as anomalous based on a couple of factors, such as an inactive user logging on to initiate a significant act, i.e., deleting files, and/or the deletion of a significant number of files, well above the norm for this or most users. To delete such files, certain policies may need to have been stopped or deleted by this user, such as shown in display area 1604. This act alone may also be seen as an anomalous act, i.e., the change or deletion of policies by an unauthorized user. A further message area 1606 may be provided to list the deleted files, or to list specific assets impacted by the anomalous activity.

The UI display of FIG. 16 is provided for purposes of example only, and any other user interface display configuration and content may be provided based on the user activity, impacted data, system configuration, and so on.

Embodiments of the system monitoring and anomaly notification process evaluates in real-time KPIs and other relevant metrics using a variety of algorithms. It uses multiple thresholds to alert users and generate reports to system operators, and provides a rich graphical reporting interface with UI tools to enable administrators to analyze anomalies in order to simplify triaging of potential system problems. It also captures user anomaly alert acknowledgement information for tracking and other purposes.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 17:
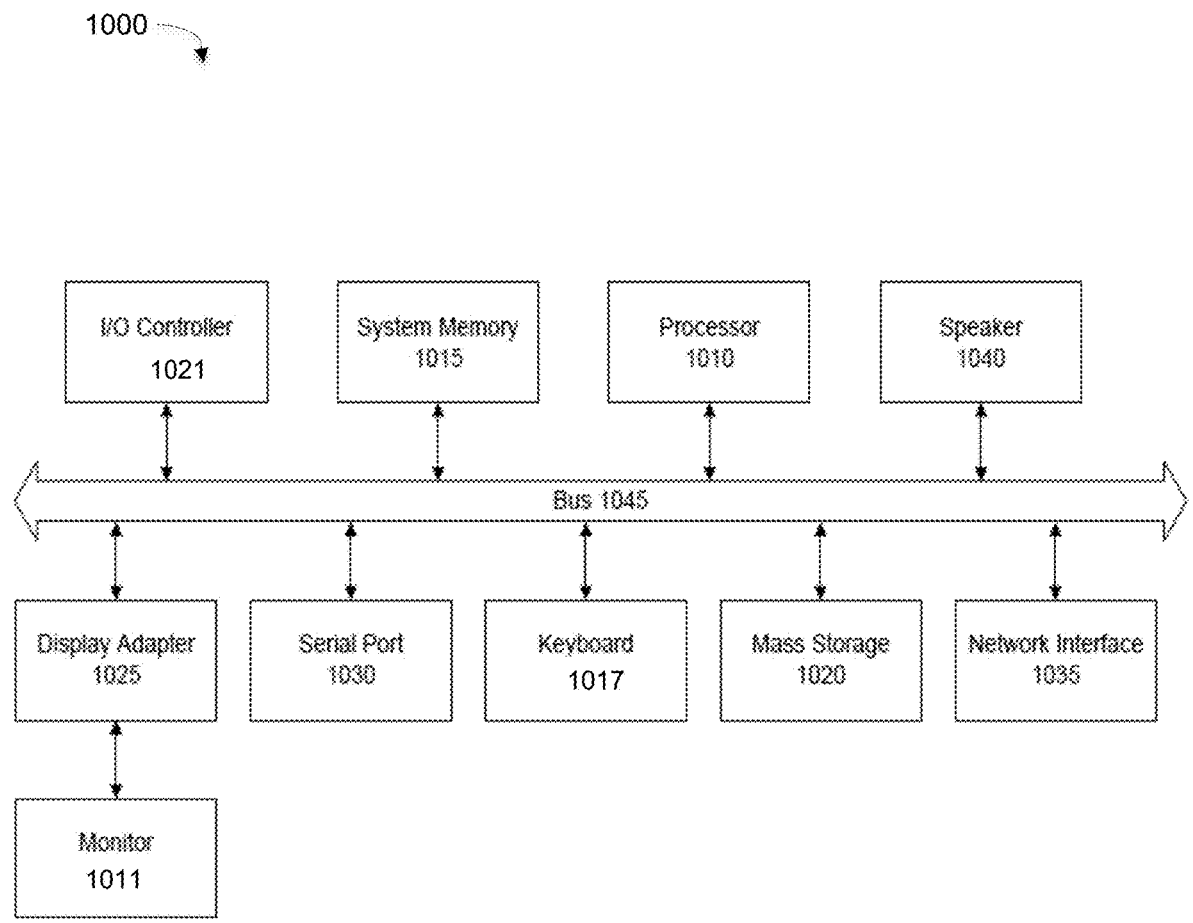
FIG. 17 is a system block diagram of a computer system used to execute one or more software components of an anomaly monitoring and notification method, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 17 shows a system block diagram of a computer system used to execute one or more software components of the present system described herein. The computer system 1000 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of detecting anomalous user behavior in a computer network, comprising:
defining key performance indicators for user behavior of a plurality of users in the computer network;
collecting behavior statistics for each of the users with respect to each of the key performance indicators;
defining normal behavior for each user with respect to the key performance indicators;
detecting anomalous behavior of a user for a key performance indicator based on the behavior statistics of the user compared to the defined normal behavior of the user for the key performance indicator; and
sending a notification to administrative personnel user upon detection of the anomalous behavior.

2. The method of claim 1 wherein the key performance indicators include at least one of: frequency of user login to the computer system, length of login, initiated and role-based activities with respect to data assets in the computer system, number of failed login attempts, and login location.

3. The method of claim 2 further comprising defining one or more threshold values for each of the key performance indicators to differentiate the normal behavior from the anomalous behavior.

4. The method of claim 3 wherein the defined threshold values comprise two different threshold value, and wherein a first notification is generated and sent to the user upon a KPI value exceeding a first threshold value but not a second threshold value, and a second notification is generated and sent to the user upon a KPI value exceeding the second threshold value.

5. The method of claim 1 wherein administrative personnel comprise information technology (IT) security personnel, and wherein the notifications are sent to the administrative personnel through a notification service or a user interface service as at least one of: an e-mail message, a short text message, a social network message, and a web browser based message.

6. The method of claim 4 further comprising:
defining one or more anomaly detection conditions to define abnormal user behavior in the computer network using the defined threshold values; and
applying an anomaly detection policy to the collected behavior statistics to define the anomalous behavior.

7. The method of claim 6 wherein the anomaly detection policy comprises an algorithm applied to one or more of the data assets, and one or more notification rules.

8. The method of claim 7 wherein the algorithm is selected from the group consisting of: simple comparison against the defined threshold values, moving average, auto regressive, a prediction algorithm, and exponential smoothing.

9. The method of claim 7 wherein a data asset comprises a dataset desired to be backed up by the user comprising at least one of: a file, a directory, a file system, and a database; and further wherein the key performance indicators are divided into subsystem or metadata types, including asset metadata, network metadata, backup metadata, and user customized metadata.

10. The method of claim 1 further comprising:
saving the collected behavior data and the detected anomalous behavior statistics to a database;
generating a report showing user behavior including the detected anomalous behavior over time; and
providing detailed graphical and textual information regarding the detected anomalous behavior from the collected performance data and system information stored in the database.

11. A computer-implemented method of providing minimizing data risk by user behavior in a computer system, comprising:
collecting user behavior data for key performance indicators for defined metrics collected for each user of the computer system;
defining an anomaly detection policy to define anomalous user behavior in the computer system using defined threshold values for each of the key performance indicators, wherein the policy comprises an algorithm applied to one or more data assets, and one or more notification rules;
applying the anomaly detection policy to a user to detect anomalous behavior by the user; and
sending a notification to administrative personnel upon a detected instance of the anomalous user behavior.

12. The method of claim 11 wherein the key performance indicators include at least one of: frequency of user login to the computer system, length of login, initiated and role-based activities with respect to data assets in the computer system, number of failed login attempts, and login location.

13. The method of claim 11 wherein the defined threshold values comprise two different threshold value, and wherein a first notification is generated and sent to the user upon a KPI value exceeding a first threshold value but not a second threshold value, and a second notification is generated and sent to the user upon a KPI value exceeding the second threshold value.

14. The method of claim 13 wherein the algorithm is selected from the group consisting of: simple comparison against the defined threshold values, moving average, auto regressive, a prediction algorithm, and exponential smoothing.

15. The method of claim 11 wherein administrative personnel comprise information technology (IT) security personnel, and wherein the notifications are sent to the administrative personnel through a notification service or a user interface service as at least one of: an e-mail message, a short text message, a social network message, and a web browser based message.

16. The method of claim 15 wherein a data asset comprises a dataset desired to be backed up by the user comprising at least one of: a file, a directory, a file system, and a database; and further wherein the key performance indicators are divided into subsystem or metadata types, including asset metadata, network metadata, backup metadata, and user customized metadata.

17. The method of claim 11 further comprising:
saving the collected behavior data and the detected anomalous behavior statistics to a database;
generating a report showing user behavior including the detected anomalous behavior over time; and
providing detailed graphical and textual information regarding the detected anomalous behavior from the collected performance data and system information stored in the database.

18. A system for detecting anomalous user behavior in a computer network, comprising:
an agent running in a user host system containing data assets to be protected, and collecting user behavior statistics for key performance indicators defining certain activities of users of the network and the data assets;
a key performance monitoring service running on a data protection system coupled to the host system and generating key performance indicator events from the collected behavior statistics from the agent;
an anomaly detection service running on a data protection system coupled to the host system detecting anomaly alerts from scans triggered by key performance indicator events received from the key performance monitoring service; and
a notification service receiving anomaly alert events from the anomaly detection service and generating notification messages to be transmitted to administrative personnel in accordance with one or more notification rules.

19. The system of claim 18 wherein the key performance indicators include at least one of: frequency of user login to the computer system, length of login, initiated and role-based activities with respect to data assets in the computer system, number of failed login attempts, and login location.

20. The system of claim 19 further comprising:
a database storing the collected behavior data and the detected anomalous behavior statistics; and
a graphical user interface component generating a report showing user behavior including the detected anomalous behavior over time, and providing detailed graphical and textual information regarding the detected anomalous behavior from the collected performance data and system information stored in the database.

* * * * *